2 Sheets—Sheet 1.

A. KATH & G. WEYNER.
STRAW-CUTTER.

No. 177,850. Patented May 23, 1876.

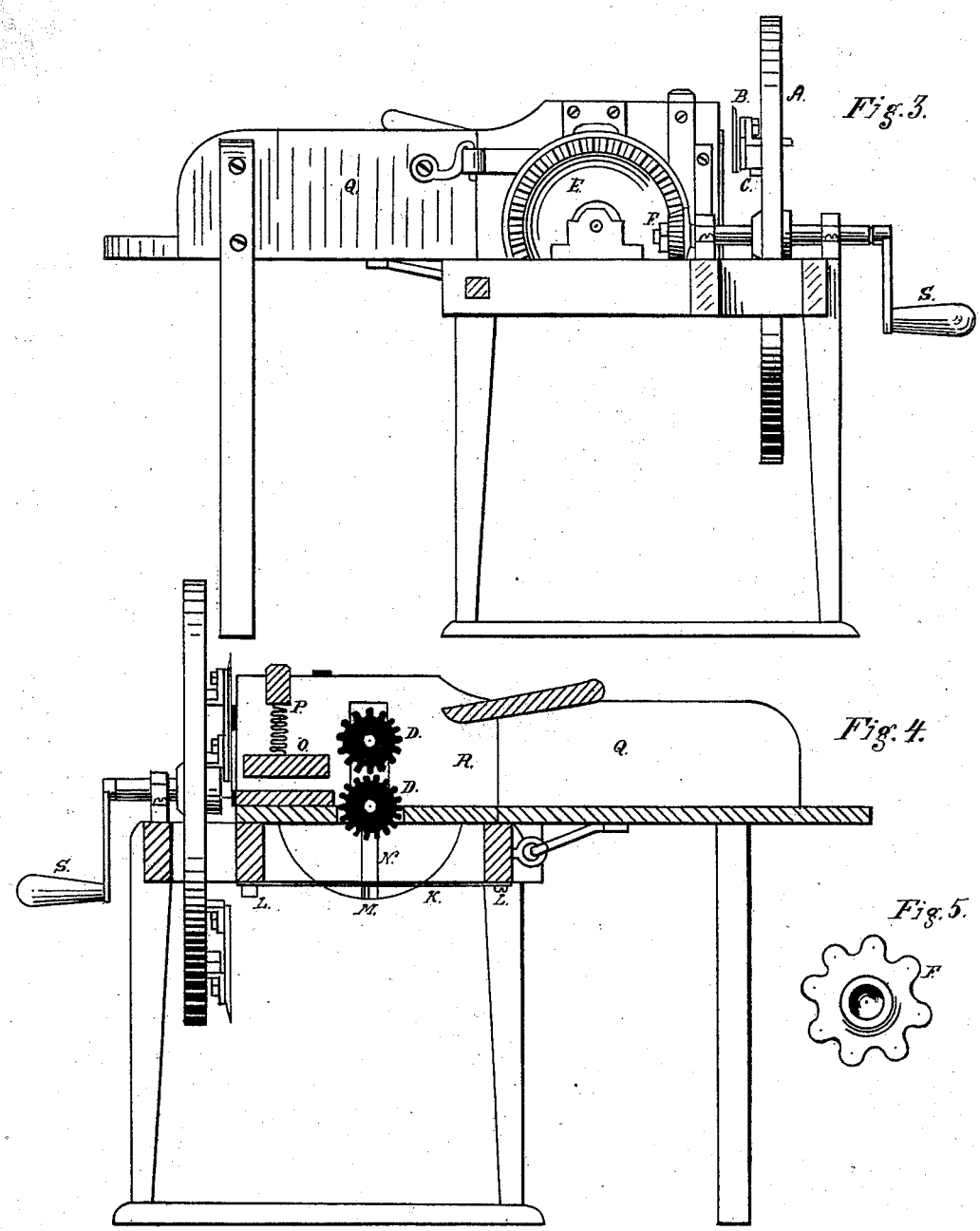

UNITED STATES PATENT OFFICE.

ALBERT KATH AND GOTTHILF WEYNER, OF GRAFTON, WISCONSIN.

IMPROVEMENT IN STRAW-CUTTERS.

Specification forming part of Letters Patent No. 177,850, dated May 23, 1876; application filed October 12, 1875.

*To all whom it may concern:*

Be it known that we, ALBERT KATH and GOTTHILF WEYNER, of Grafton, in the county of Ozaukee, and in the State of Wisconsin, have invented certain Improvements in Straw-Cutters, of which the following is a specification:

The object of our invention is to cut straw or hay for cattle, and is a machine arranged so as to cut the feed into such lengths as may be desired. The knives are thought to be different from other machines, inasmuch as they cut with a shearing motion, and the article to be cut is held by springs, yielding so that it may pass through the machine with facility.

Figure 1:
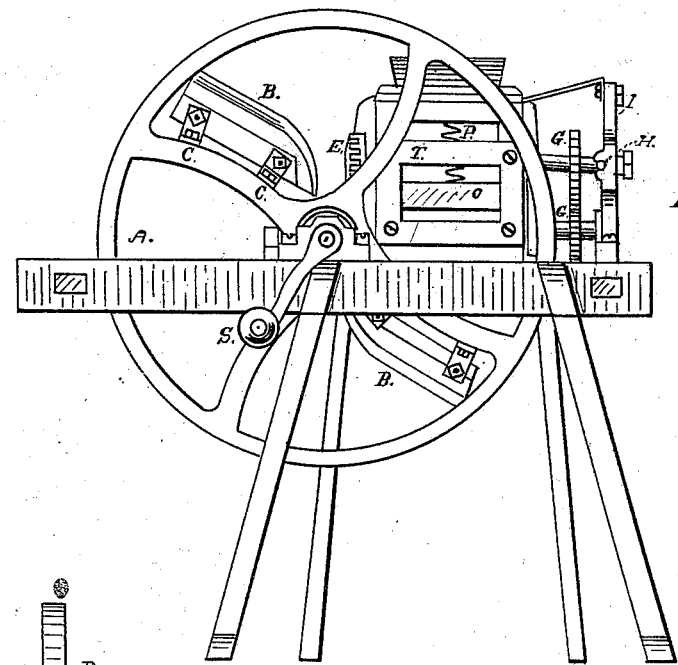
Figure 2:
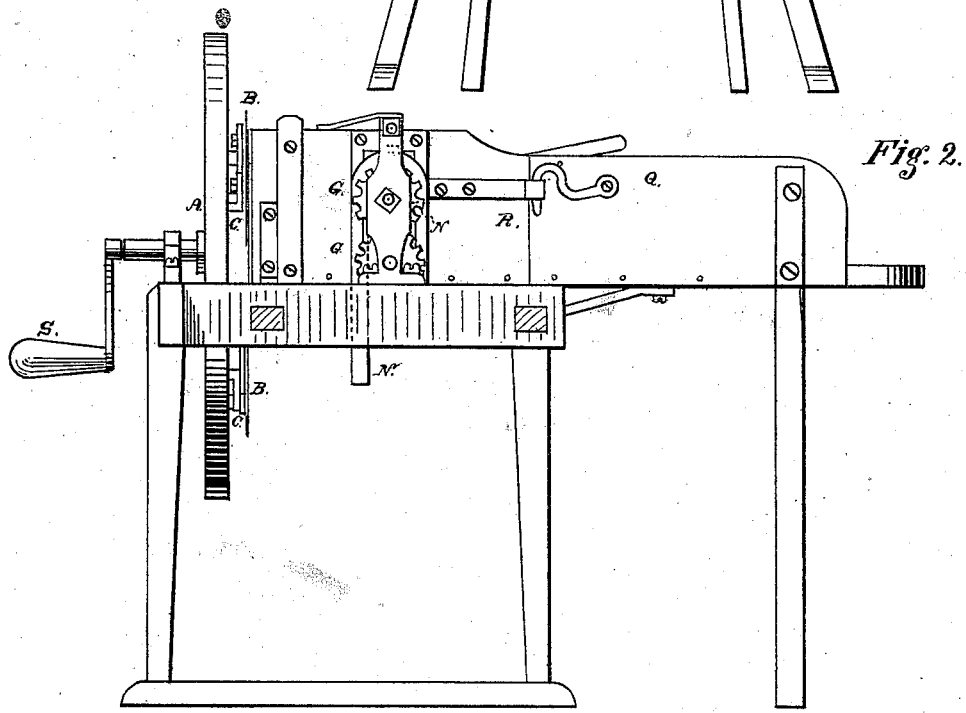

Figure 1, Sheet 1, is a front view of our invention; Fig. 2, Sheet 1, a side view of same. Fig. 3, Sheet 2, is a view of the other side of the machine; Fig. 4, Sheet 2, a sectional view through the machine longitudinally; and Fig. 5, Sheet 2, a view of an extra pinion for shifting and altering the feed.

A is the wheel, to which are attached the knives; B B, the knives attached to the arms of the wheel; C C, the adjustable attachments by which the knives are attached to the wheel; D D, the feed-rollers; E, cog-wheel on the lower roller-shaft; F, pinion, meshing into cog-wheel E; G G, wheels on the feed-roller shaft, meshing together, so that as the cog-wheel shall revolve the lower shaft, the lower wheel, meshing into the upper one, will revolve the upper wheel as the lower one is revolved, and thus revolve the upper feed-roller; H, a round step of the upper feed-shaft in the post I, which, as heavier stuff passes through the feed-rollers as the upper feed-roller rises, will turn, and the feed-rollers can be spread apart, and the cog-wheels G remain together; K, a straight spring, the ends secured to the girts L L, and across this spring is bar M, to the end of which are attached keepers N. These keepers pass up and hook over the upper shaft of feed-roller, and hold the upper roller down onto the hay or straw while being cut. O, a pressure-block in front of the knives, which is held down by a spring, P. This spring P stands on the center of block O, so as the hay or straw passes along under the block, if it passes uneven, the thickest part at either side of the block, it will yield and let it pass through. Q, feed-trough, through which hay or straw is fed to the machine; S, the crank with which the machine is operated; T, the face by which the knives shave down by and cut the hay or straw; F', an extra pinion to change the feed.

We claim as our invention—

Rocking step H, with upper feed-roller D stepped in its side, so as the roller rises the step H rolls, in combination with feed-rollers D D and cog-wheels G G, substantially as set forth.

ALBERT KATH.
GOTTHILF WEYNER.

Witnesses:
F. B. SMITH,
WM. RIETZ.